United States Patent Office 2,723,989
Patented Nov. 15, 1955

2,723,989

DICYCLOPENTENYL THIONOCARBAMATES

Marion W. Harman, Nitro, W. Va., assignor to Monsanto Chemical Company, St. Louis, Mo., a corporation of Delaware No Drawing. Application February 24, 1954,
Serial No. 412,388

4 Claims. (Cl. 260—455)

This invention relates to a new class of thionocarbamates and to methods for their preparation.

The new compounds possess the structure

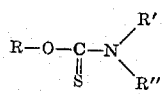

where R represents the dicyclopentenyl group and R' and R" are selected from a group consisting of hydrogen, alkyl, aralkyl and alicyclic radicals, as for example methyl, ethyl, propyl, isopropyl, butyl, isobutyl, tert-butyl, amyl, isoamyl, tert-amyl, benzyl, alpha methyl benzyl, beta phenethyl, tetrahydrofurfuryl and cyclohexyl groups and substituted derivatives thereof. Suitable substituents are halogen, hydroxy, amino, alkoxy, nitro and mercapto groups and more particularly 2-chloroethyl, 2-hydroxyethyl, 2-butoxyethyl, 2-mercaptoethyl, 2-ethylmercaptoethyl, 2-dimethylaminoethyl, 3-methoxy propyl, 3-isopropoxypropyl, hydroxy tertiary butyl and 2-cyanoethyl groups.

Although other methods of preparation are suitable, the new compounds are conveniently obtained by converting dicyclopentenyl alcohol to the xanthate, condensing the xanthate with chloroacetic acid and treating the condensation product with ammonia or an amine. From alkylene diamines such as ethylene diamine, propylene diamine and hexamethylene diamine bis compounds of the general type

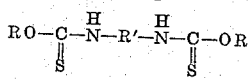

are obtained where R has the same significance as before and R' represents an alkylene group. The detailed examples below illustrate the preparation and properties of the new compounds in detail.

Example 1

A commercial sample of dicyclopentenyl alcohol boiling at 239–241° C./773 mm. (C₁₀H₁₃OH—M. W. 150) was converted to the sodium alcoholate. 123.9 grams (0.825 mole) was dissolved in 600 cc. of pure dry xylene and the solution heated to 110° C. 19 grams of metallic sodium was then added in small pieces over a period of 20 minutes, keeping the temperature at 110° C. and stirring the solution continuously. The temperature was then raised to 136° C. at which point slow reflux took place. Hydrogen was given off and the sodium dissolved slowly. After refluxing for about 4 hours a clear solution was formed.

The sodium xanthate was formed by adding carbon bisulfide at 25° C. The sodium xanthate was insoluble in the xylene but not sufficiently crystalline to effect a good separation. Accordingly, as much of the solvent as possible was removed by decantation and the residue air dried at 50° C. until most of the xylene had volatilized. The xanthate was then firm enough to grind to a powder. The powder was air dried for about an hour at 50° C. in a forced draft oven to yield 219 grams of a light tan colored product. The yield was substantially quantitative.

A solution of sodium chloroacetate was prepared by dissolving 34.7 grams (0.367 mole) of chloroacetic acid in enough 20% sodium carbonate solution to provide a solution having a pH of about 8. The solution so prepared was poured over 91 grams (0.367 mole) of sodium dicyclopentenyl xanthate prepared as described above. The mixture warmed up slightly from the exothermic reaction and was allowed to stand for about an hour to complete the reaction. There was then added 24 grams (0.40 mole) of isopropylamine during which addition the reaction mixture was stirred. The reaction mixture was shaken with 300 ml. of benzene, the aqueous layers separated and the benzene solution washed several times with water, dried over anhydrous sodium sulfate and the solvent removed by distillation to yield 76 grams of exo-3a,4,5,6,7,7a-hexahydro-4,7-methane-6-indenyl N-isopropylthionocarbamate as an amber oil. The oil subsequently set to a gummy solid, M. P. 70–74° C.

Example 2

A cold (5° C.) solution of sodium chloroacetate prepared by neutralizing 48.5 grams (0.513 mole) of chloroacetic acid with 20% sodium carbonate solution to a pH of about 8 was poured over 124 grams (0.5 mole) of sodium dicyclopentenyl xanthate. The mixture was put aside in an ice chest for about 20 hours and then ammonia bubbled through for a total of about 130 minutes and the mixture again set aside in an ice chest for about 20 hours. The solid product was separated by filtration, washed several times with water and dried to yield 90.5 grams (86% of theoretical) of exo-3a,4,5,6,7,7a-hexahydro-4,7-methane-6-indenyl thionocarbamate, M. P. 76–79° C. The structure of the product is as follows:

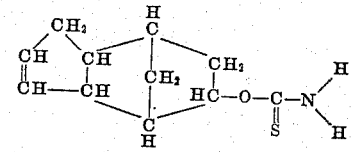

These compounds are efficient defoliants. For example application in the form of a spray containing 0.3% of the active ingredient resulted in 100% defoliation of beans.

It is intended to cover all changes and modifications of the examples of the invention herein chosen for purposes of disclosure which do not constitute departures from the spirit and scope of the invention.

What is claimed is:

1. A new compound of the structure

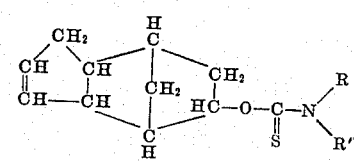

where R and R' are selected from the group consisting of hydrogen, lower alkyl, hydroxy-, alkoxy-, mercapto-, alkyl mercapto-, halogen-, amino-, nitro-, cyano-, and phenyl-substituted lower alkyl radicals, cyclohexyl and tetrahydrofurfuryl radicals.

2. A new compound of the structure

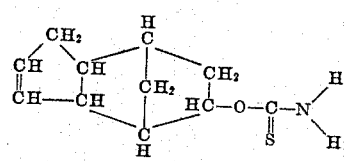

3. A new compound of the structure
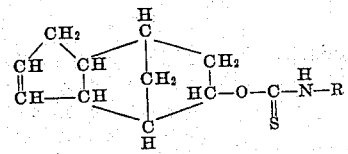
where R represents a lower alkyl radical.
4. A new compound of the structure
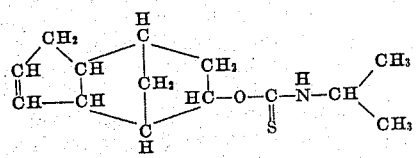
References Cited in the file of this patent
UNITED STATES PATENTS
| | | | |
|---|---|---|---|
| 2,225,124 | Martin | | Dec. 17, 1940 |
| 2,650,876 | Stewart | | Sept. 1, 1953 |
| 2,681,913 | Cusic | | June 22, 1954 |
OTHER REFERENCES
Holmberg et al.: Chem. Abstracts, vol. 19, page 57 (1925).